(12) United States Patent
Harada

(10) Patent No.: US 10,958,798 B2
(45) Date of Patent: Mar. 23, 2021

(54) IMAGE FORMING APPARATUS, DISPLAY CONTROL METHOD, AND RECORDING MEDIUM

(71) Applicant: Tomofumi Harada, Kanagawa (JP)

(72) Inventor: Tomofumi Harada, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/689,268

(22) Filed: Nov. 20, 2019

(65) Prior Publication Data

US 2020/0177734 A1 Jun. 4, 2020

(30) Foreign Application Priority Data

Nov. 29, 2018 (JP) .............................. JP2018-224077

(51) Int. Cl.
*H04N 1/00* (2006.01)
*H04N 1/23* (2006.01)
*G06F 3/12* (2006.01)

(52) U.S. Cl.
CPC ......... *H04N 1/0044* (2013.01); *G06F 3/1208* (2013.01); *G06F 3/1256* (2013.01); *H04N 1/2323* (2013.01); *H04N 1/2338* (2013.01)

(58) Field of Classification Search
CPC .. H04N 1/0044; H04N 1/2323; H04N 1/2338; G06F 3/1208; G06F 3/1256
USPC ........................................................ 358/1.2
See application file for complete search history.

(56) References Cited

U.S. PATENT DOCUMENTS

| | | | | |
|---|---|---|---|---|
| 6,285,842 B1* | 9/2001 | Katamoto | ......... | H04N 1/00352 399/14 |
| 2007/0229903 A1* | 10/2007 | Sato | ...................... | G06F 3/1208 358/1.18 |
| 2011/0134469 A1* | 6/2011 | Kuroda | .............. | H04N 1/00411 358/1.15 |
| 2011/0157642 A1* | 6/2011 | Nemoto | ................. | G03G 15/50 358/1.15 |
| 2011/0199629 A1* | 8/2011 | Sensu | ................ | H04N 1/00442 358/1.13 |
| 2013/0141738 A1* | 6/2013 | Shibata | .............. | H04N 1/00413 358/1.2 |
| 2015/0286906 A1* | 10/2015 | Murakami | ............. | H04N 1/393 358/1.2 |
| 2018/0278756 A1 | 9/2018 | Shibukawa et al. | | |

FOREIGN PATENT DOCUMENTS

JP 2011-042176 3/2011
JP 2011-205356 10/2011

* cited by examiner

*Primary Examiner* — Allen H Nguyen
(74) *Attorney, Agent, or Firm* — Harness, Dickey & Pierce, P.L.C.

(57) ABSTRACT

An image forming apparatus includes an image forming device; and circuitry to receive an instruction to print an image based on image data according to print settings, and based on a determination that the print settings indicate to print the image on a recording sheet having a second size larger than a first size of the image, control a display to display a preview image that reflects a printed image of the image data, the preview image including a margin at least at one side of the printed image, the margin having a size determined based on the second size of the recording sheet.

19 Claims, 17 Drawing Sheets

FIG. 4

| MAIN-SCANNING DIRECTION | 305mm |
|---|---|
| SUB-SCANNING DIRECTION | 457mm |

FIG. 5

| PAPER TYPE | MAIN-SCANNING DIRECTION | SUB-SCANNING DIRECTION |
|---|---|---|
| 13 × 19 LANDSCAPE | 330.2mm | 482.6mm |
| 12 × 18 LANDSCAPE | 304.8mm | 457.2mm |
| A3 LANDSCAPE | 297mm | 420mm |
| B4 LANDSCAPE | 257mm | 364mm |
| A4 LANDSCAPE | 210mm | 297mm |
| A4 PORTRAIT | 297mm | 210mm |
| B5 LANDSCAPE | 182mm | 257mm |
| B5 PORTRAIT | 257mm | 182mm |
| A3 LONG LANDSCAPE 1 | 297mm | 482.6mm |
| A3 LONG LANDSCAPE 2 | 330.2mm | 420mm |
| ⋮ | ⋮ | ⋮ |

FIG. 7

| PAGE | MAIN-SCANNING DIRECTION | SUB-SCANNING DIRECTION |
|---|---|---|
| P.1 | 330mm | 482mm |
| P.2 | 330mm | 482mm |
| P.3 | 330mm | 482mm |
| ⋮ | ⋮ | ⋮ |

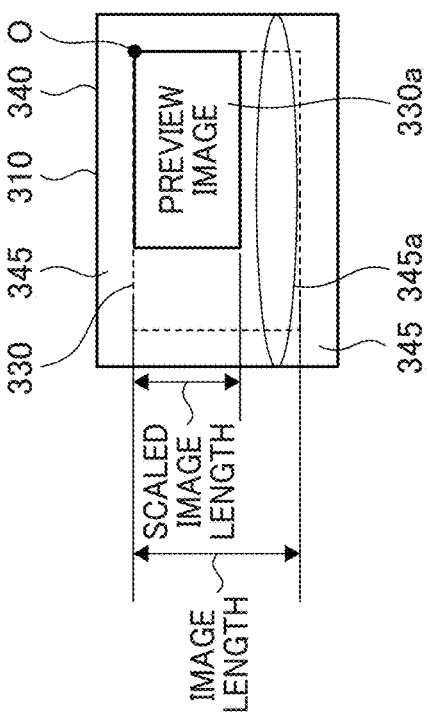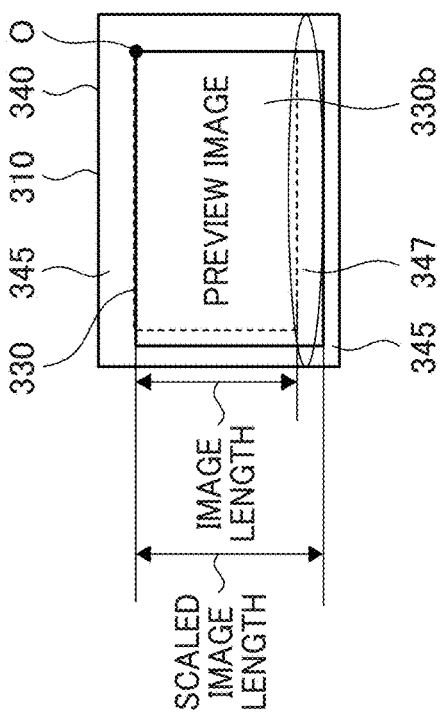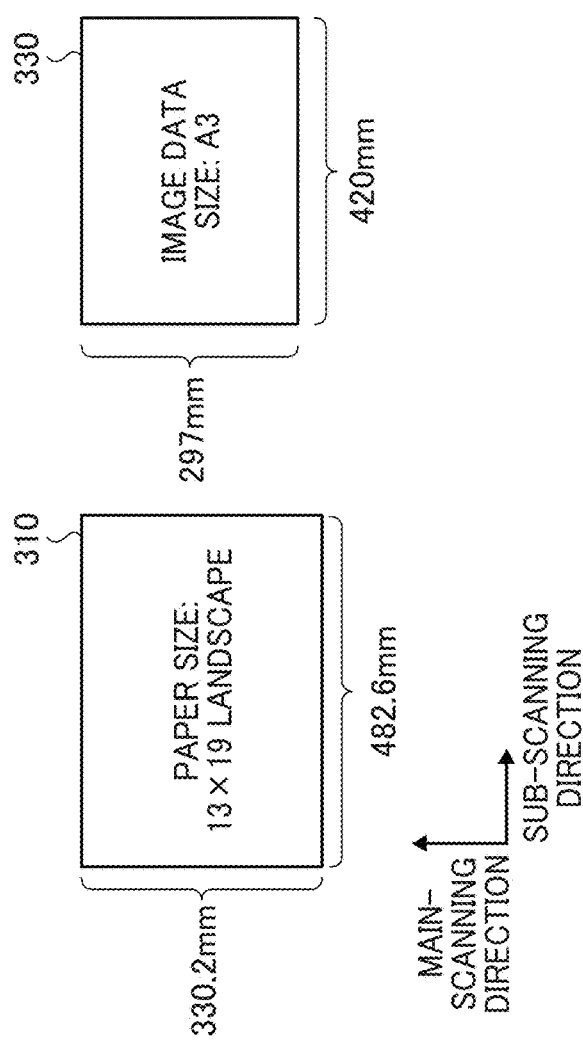

FIG. 19A
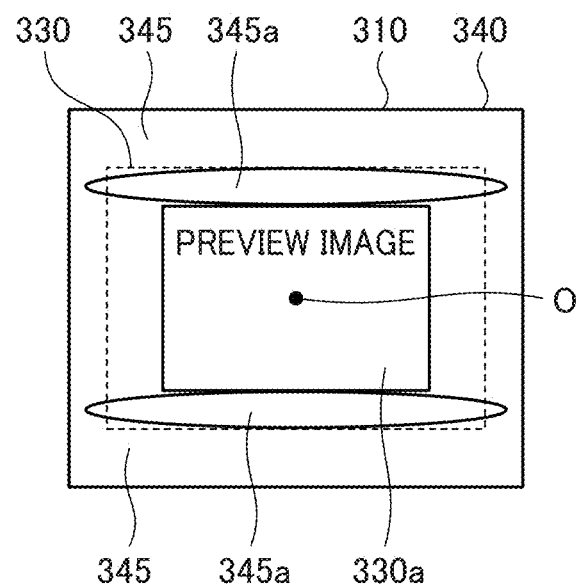
FIG. 19B
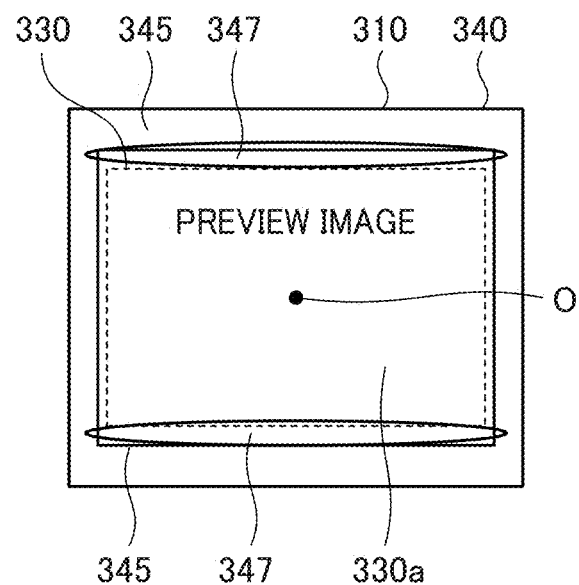
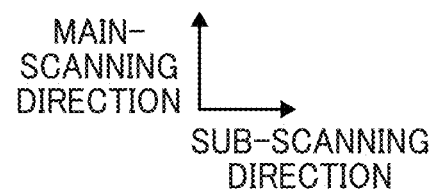

IMAGE FORMING APPARATUS, DISPLAY CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-224077, filed on Nov. 29, 2018, in the Japan Patent Office, the entire disclosure of which is hereby incorporated by reference herein.

BACKGROUND

Technical Field

The present invention relates to an image forming apparatus, a display control method, and a recording medium.

Description of the Related Art

The background image forming apparatus displays a preview screen to allow a user to check a printed image based on a print setting set by a user before printing, and prints after the user confirms the preview screen.

For example, in the case where a binding process is to be performed on multiple document images that are printed, the image forming apparatus displays, on an operation screen, preview images of the document images in multiple pages, which are arranged along a vertical direction or a horizontal direction according to a binding position of printed paper.

However, no consideration is given to the preview screen when the paper of the larger size than the image forming area (hereinafter referred to as long paper) is used for printing. When the long paper is used for printing, the image is formed at a center of the paper, and a margin is provided around the image. However, when the image is displayed in preview, a portion of the long paper other than the image forming area is not displayed. As a result, there is a problem that a different image from an image of final paper is displayed.

SUMMARY

Example embodiments include an image forming apparatus including an image forming device; and circuitry to receive an instruction to print an image based on image data according to print settings, and based on a determination that the print settings indicate to print the image on a recording sheet having a second size larger than a first size of the image, control a display to display a preview image that reflects a printed image of the image data, the preview image including a margin at least at one side of the printed image, the margin having a size determined based on the second size of the recording sheet.

Example embodiments includes a display control method, and a recording medium storing a control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a table illustrating an example of image forming area information;

FIG. 5 is a table illustrating an example of paper length information;

FIG. 7 is a table illustrating an example of reading size information according to the first embodiment;

FIGS. 18A to 18C (FIG. 18) are a view illustrating an example of preview image display processing at a time when image data is scaled according to a second embodiment; and FIGS. 19A and 19B (FIG. 19) are a view of another example of the preview image display processing at the time when the image data is scaled according to the second embodiment.

Figure 1:
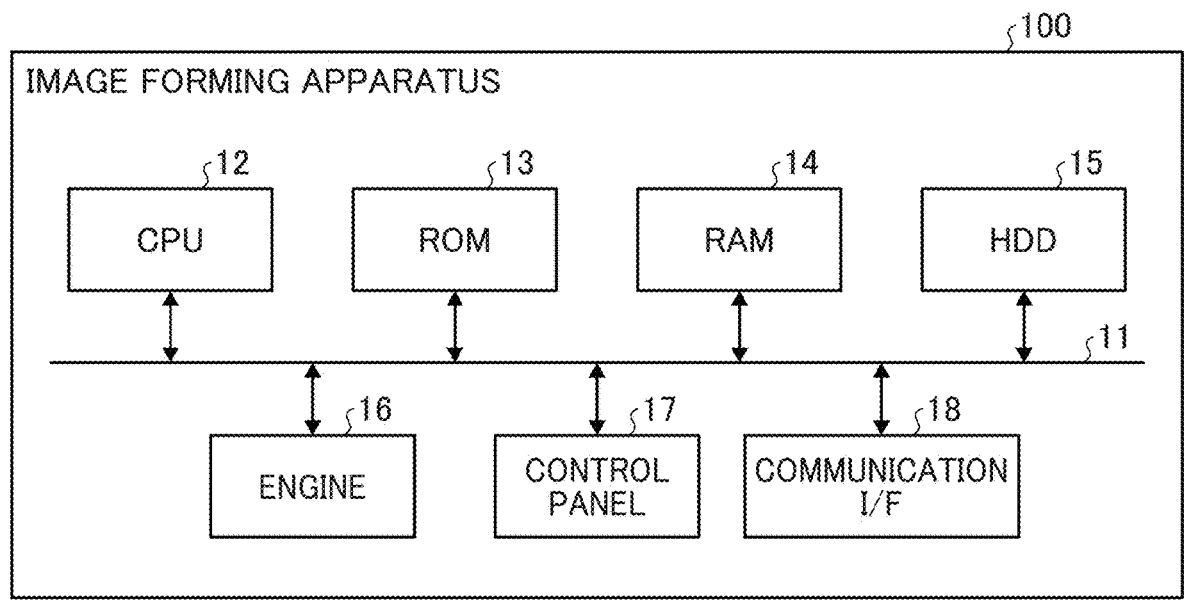
FIG. 1 is a block diagram illustrating an example of a hardware configuration of an image forming apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A detailed description will hereinafter be made on embodiments of an image forming apparatus, an image forming method, and a program with reference to the accompanying drawings.

FIG. 1 is a block diagram illustrating an example of a hardware configuration of an image forming apparatus according to a first embodiment. An image forming apparatus 100 includes a central processing unit (CPU) 12, read only memory (ROM) 13, random access memory (RAM) 14, and a hard disk drive (HDD) 15. In alternative to the HDD 15, any storage device such as a solid state drive (SSD) may be provided. The image forming apparatus 100 also includes an engine 16, a control panel 17, and a communication interface (I/F) 18. The above components are mutually coupled via a system bus 11.

The engine 16 is hardware that executes various functions such as a copier function, a scanner function, and a printer function and executes general-purpose information processing and processing other than communication to achieve these functions. For example, the engine 16 includes a scanner that reads a document, a plotter that prints on a sheet material such as paper, and the like. The engine 16 can further include particular optional devices such as a finisher that sorts the printed sheet materials and an auto document feeder (ADF) that automatically feeds the document.

The CPU 12 controls overall operation of the image forming apparatus 100. The CPU 12 uses the RAM 14 as a work area, and executes a program that is stored in any one of the ROM 13, the HDD 15, and the like. In this way, the CPU 12 controls the overall operation of the image forming apparatus 100. That is, the CPU 12 controls the engine 16 to execute the scanner function, printer function, and the like.

The control panel 17 accepts various types of input according to an operation by the user, and displays various images (screens). In the present embodiment, a description will be made on a case where the control panel 17 is a touchscreen that integrally includes both of an accepting function to accept the various types of the input and a display function to display the various images (screens). However, the control panel 17 is not limited thereto. For example, the control panel 17 may be configured to include, as separate components: an input device that accepts the various types of the input; and a display device that displays various types of information.

The communication I/F 18 is an interface that communicates with an external device (for example, a client terminal or the like) via a network.

Figure 2:
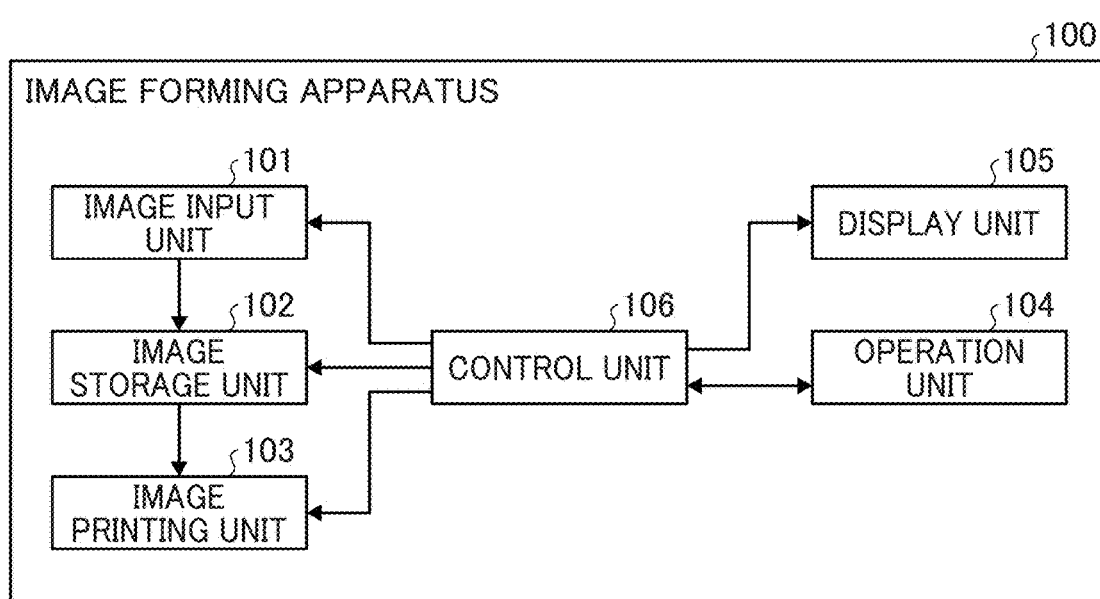
FIG. 2 is a block diagram illustrating an example of a functional configuration of the image forming apparatus according to the first embodiment.

FIG. 2 is a block diagram illustrating an example of a functional configuration of the image forming apparatus according to the first embodiment. The image forming apparatus 100 includes an image input unit 101, an image storage unit 102, an image printing unit 103, an operation unit 104, a display unit 105, and a control unit 106.

The image input unit 101 receives scanned data of a paper document from an optical scanner, or print data from an information processing apparatus such as a desktop/laptop personal computer, or the like, as digitized image data to be processed. The image input unit 101 is implemented by an instruction generated by the CPU 12 according to the program, a reading device such as the optical scanner, and the communication interface 18.

The image storage unit 102 stores the image data generated by the image input unit 101. In one example, the image storage unit 102 temporarily stores the image data until printing is completed, such as a case where the paper document is copied or a case where the print data from the information processor is printed. There is also a case where the image storage unit 102 keeps the image data for reuse even after the image forming apparatus 100 is turned off. The image storage unit 102 saves the image data, for example, in at least one of the RAM 14 and the HDD 15 illustrated in FIG. 1 depending on application. The image storage unit 102 is implemented by the instruction generated by the CPU 12 according to the program, and memory such as the RAM 14 and the HDD 15.

The image printing unit 103 prints the image data, which is stored in the image storage unit 102, on a recording sheet. The recording sheet is paper, for example. The image printing unit 103 is implemented by the instruction generated by the CPU 12 according to the program, and the engine 16.

The operation unit 104 accepts an instruction to read or print the document from the user, and accepts an instruction for detailed settings of a reading condition or a printing condition by the user.

The display unit 105 displays information on a document reading operation or a document printing operation for the user. As the information on the document reading operation and the document printing operation, a reading condition setting screen, a printing condition setting screen, a reading instruction screen, a printing instruction screen, a print preview screen, and the like are exemplified.

Figure 3:
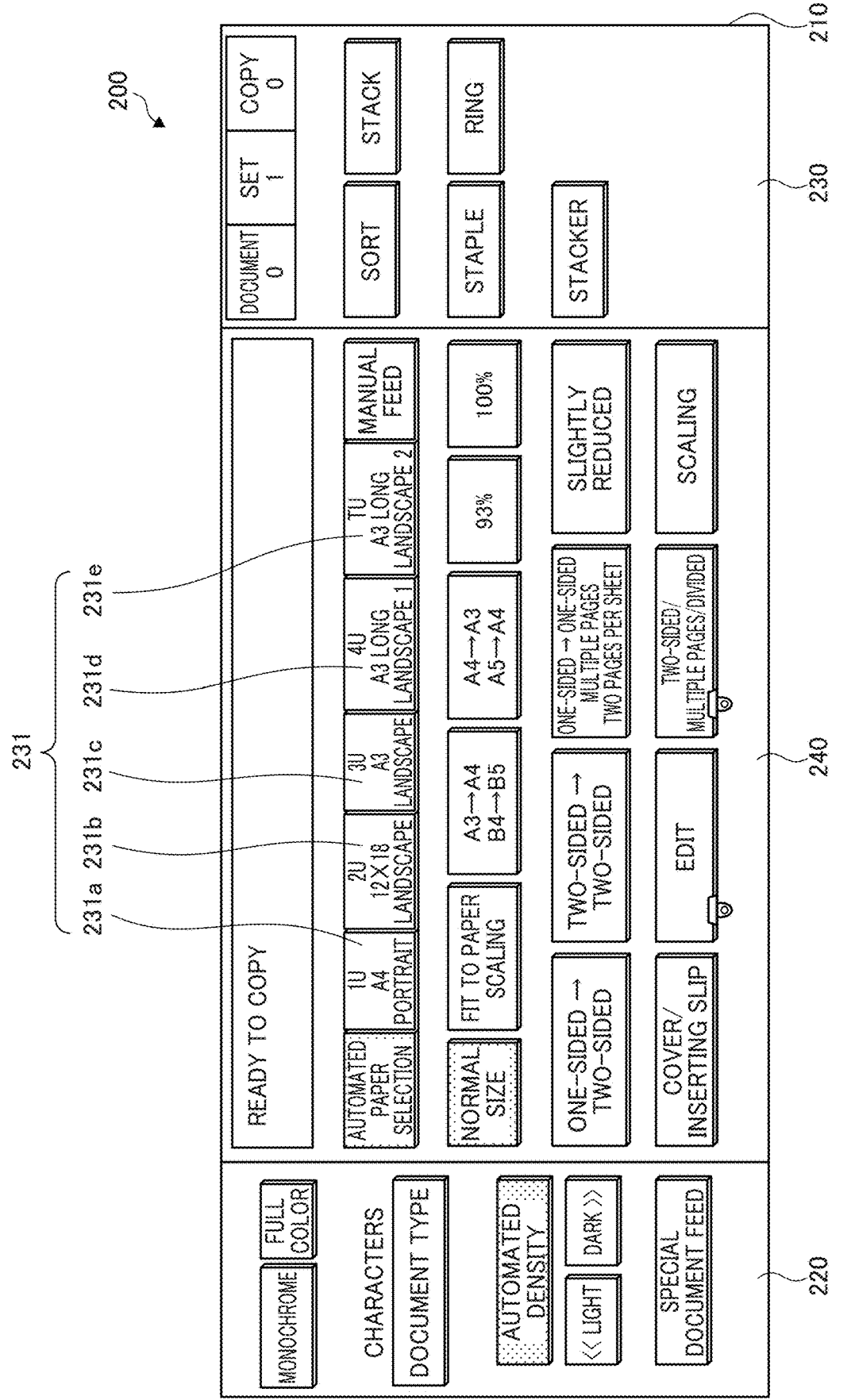
FIG. 3 is a view illustrating an example of configurations of an operation unit and a display unit according to the first embodiment.

The operation unit 104 and the display unit 105 may be configured separately like a display unit and buttons, or may be configured integrally like the touchscreen of a display unit with a position input unit. FIG. 3 is a view illustrating an example of configurations of the operation unit and the display unit according to the first embodiment. In this example, the operation unit 104 and the display unit 105 are configured as a touchscreen 200.

The touchscreen 200 includes a display screen 210, which is provided with three touchscreen areas 220, 230, and 240. In the touchscreen area 220, buttons used to set an output color, a document image type, a copy output density, document feed, and the like are arranged. In touchscreen area 230, buttons used to set post-copy processing and a display area of the number of the documents, the number of sets (the number of copies) of the documents, and the number of sets (the number of copies) of the copied documents are arranged.

In the touchscreen area 240, buttons used to select a paper type for a print target, set an output scale of the print target, and set a printing method of the print target on the paper, and the like are arranged. Here, the paper has a rectangular shape having, as a contour, a pair of first sides that extend in a first direction and a pair of second sides that extend in a second direction orthogonal to the first direction. For the selection of the paper type for the print target, feed tray selection buttons 231 are provided to select a feed tray for the print target. Each of the feed tray selection buttons 231 is used to select a feed tray provided in the image forming apparatus 100. Here, selection buttons 231a to 231e are arranged to select a first feed tray to a fifth feed tray, respectively. In addition, each of the selection button 231a to 231e displays information for identifying the feed tray and details of the paper set in the corresponding feed tray. For example, the selection button 231a indicates that the A4-size paper is vertically placed in the first teed tray, and the selection button 231b indicates that 12 inch×18 inch paper is horizontally placed in the second feed tray. The selection button 231c indicates that the A3-size paper is horizontally placed in the third feed tray, the selection button 231d indicates that A3 long paper 1, a size of which in a sub-scanning direction is larger than the A3 size, is horizontally placed in the fourth feed tray, and the selection button 231e indicates that A3 long paper 2, a size of which in a main-scanning direction is larger than the A3 size, is horizontally placed in the fifth feed tray. When any one of the selection buttons 231a to 231e among the feed tray selection buttons 231 is selected, the image forming apparatus 100 performs printing by using the paper that is set in the feed tray selected by the selection button. In the embodiment described below, the long paper means the paper of a larger size than an image forming area.

The control unit 106 controls the image input unit 101, the image storage unit 102, the image printing unit 103, the operation unit 104, and the display unit 105. More specifically, according to an instruction from the operation unit 104, the control unit 106 executes the instruction such as the image input, display of a preview image, or image printing. The control unit 106 has a function of controlling the display of the preview image to preview a print result at the time when the image data is printed according to print setting set by a user, on the display unit 105.

In the present embodiment, the control unit 106 determines a reading size of the image data, which is generated in the image input unit 101, according to the paper size selected by the feed tray selection button 231 and a size of the image forming area in the image printing unit 103. In general, the reading size of the image data is a size in which an overlapping amount of the image forming area and the paper overlapped in the same direction is maximized. The image storage unit 102 stores the image data of the determined reading size. The reading size includes an image length in the main-scanning direction and an image length in the sub-scanning direction in the case where a paper transport direction is set as the sub-scanning direction and a direction that is parallel to the paper and perpendicular to the sub-scanning direction is set as the main-scanning direction. The image length in the main scanning direction is a shorter one of the paper size and the image forming area size in the main scanning direction, and the image length in the sub-scanning direction is a longer one of the paper size and the image forming area size in the sub-scanning direction.

In addition, when accepting the instruction to display the image preview from the operation unit 104, the control unit 106 creates the image according to a magnitude relationship between the selected paper size and the reading size of the image data, and then displays the preview on the display unit 105. Here, the control unit 106 compares the paper size and the reading size of the image data in each of the main-scanning direction and the sub-scanning direction, so as to control a way of displaying the preview.

For example, in the case where the paper size and the reading size are the same in both of the main scanning direction and the sub-scanning direction, the control unit 106 displays the preview of the image data, which is stored in the image storage unit 102, as is on the display unit 105. Meanwhile, in the case where the paper size is smaller than the reading size in at least one of the main-scanning direction and the sub-scanning direction, the control unit 106 displays the preview of the image data, which is stored in the image storage unit 102, on the display unit 105 by partially cutting the image data in the corresponding direction. Furthermore, in the case where the paper size is larger than the reading size in at least one of the main scanning direction and the sub-scanning direction, the control unit 106 displays the preview of the image data, which is stored in the image storage unit 102, on the display unit 105 by adding a margin to the image data in the corresponding direction.

In order to execute such processing, the control unit 106 keeps image forming area information of the image printing unit 103 and paper length information per paper type. FIG. 4 is a table illustrating an example of the image forming area information, and FIG. 5 is a table illustrating an example of the paper length information. The image forming area information in FIG. 4 indicates the size of the image forming area in the image printing unit 103 in the main-scanning direction and the sub-scanning direction. This image forming area information differs by the image forming apparatus 100, and is stored in the control unit 106 as apparatus-specific information.

The paper length information in FIG. 5 indicates the size of the paper, which is possibly used in the image forming apparatus 100, in the main scanning direction and the sub-scanning direction per paper type. In addition to a standard size of the paper, the size of the A3 long paper is included herein. A paper type "A3 LONG LANDSCAPE 1" is longer in the sub-scanning direction than A3 paper, and a paper type "A3 LONG LANDSCAPE 2" is longer in the main-scanning direction than the A3 paper. Such paper length information is stored in the control unit 106. The control unit 106 uses the paper length information, and thus can convert the image data to have the lengths of the paper set in the feed tray in the main-scanning direction and the sub-scanning direction from the paper type in the feed tray, which is selected by the operation unit 104.

Figure 6:
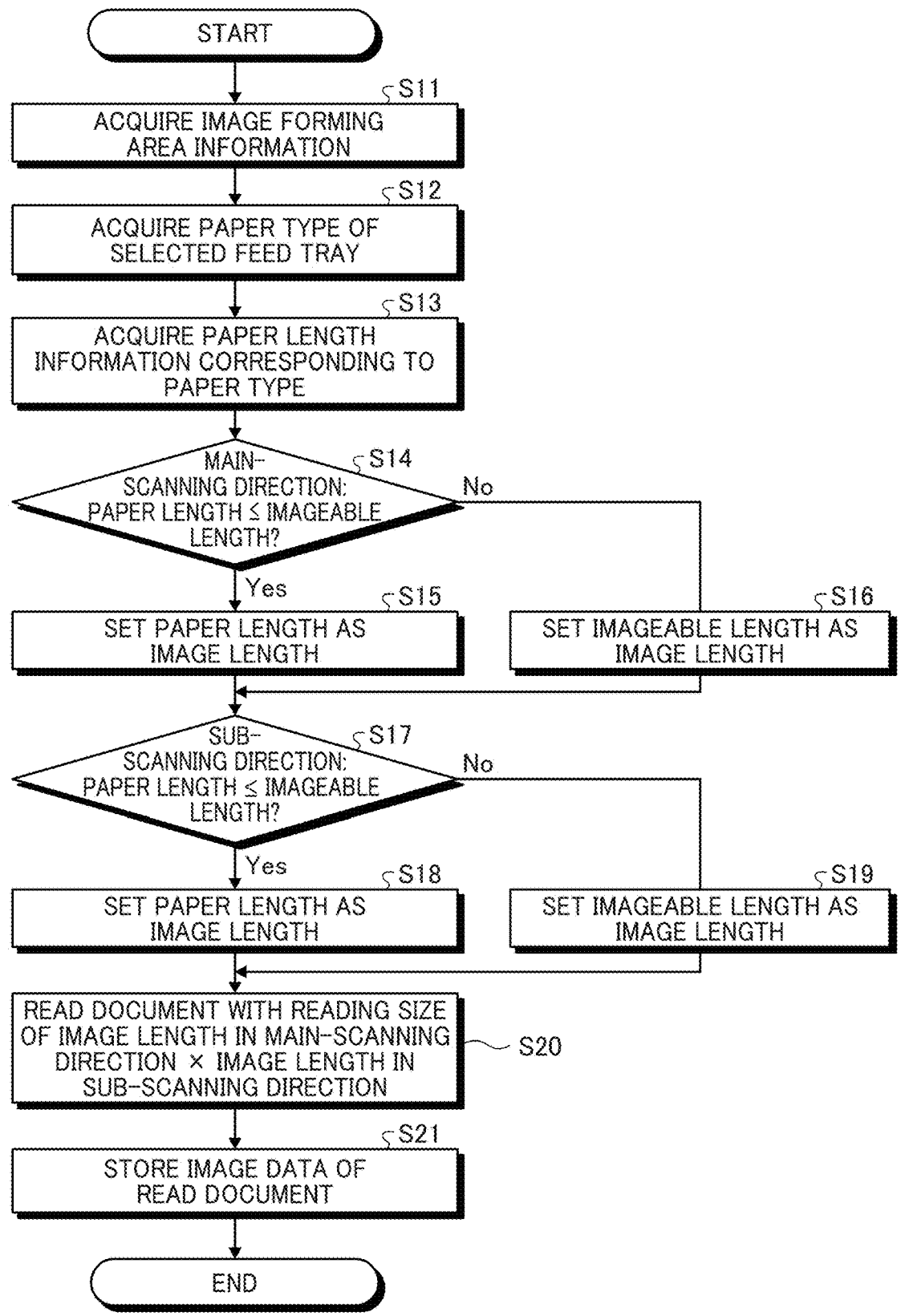
FIG. 6 is a flowchart illustrating an example of a procedure of document reading processing at a time of copying according to the first embodiment.

Next, a description will be made on the image forming method that includes a method for displaying the preview screen in such an image forming apparatus. FIG. 6 is a flowchart illustrating an example of a procedure of document reading processing at the time of copying according to the first embodiment.

First, the control unit 106 acquires the image forming area information of the image printing unit 103 (step S11). Then, the control unit 106 acquires the paper type that is set in the feed tray selected by the user from the operation unit 104 (step S12), and acquires the paper length information that corresponds to the paper type (step S13).

Thereafter, the control unit 106 determines whether the length of the selected paper (hereinafter referred to as a paper length) is equal to or shorter than the length of the image forming area (hereinafter referred to as the imageable length) in the main-scanning direction (step S14). If the paper length is equal to or shorter than the imageable length (if Yes in step S14), the control unit 106 sets the paper length as the image length (step S15). If the paper length is longer than the imageable length (if No in step S14), the control unit 106 sets the imageable length as the image length (step S16).

After step S15 or step S16, the control unit 106 determines whether the paper length is equal to or shorter than the imageable length in the sub-scanning direction (step S17). If the paper length is equal to or shorter than the imageable length (if Yes in step S17), the control unit 106 sets the paper length as the image length (step S18). If the paper length is longer than the imageable length (if No in step S17), the control unit 106 sets the imageable length as the image length (step S19).

After step S18 or step S19, the control unit 106 instructs the image input unit 101 to read the document with the reading size of the image length in the main-scanning direction×the image length in the sub-scanning direction. Accordingly, the image input unit 101 uses the optical scanner to read the paper document with the instructed reading size (step S20), generates the image data, and stores the generated image data in the image storage unit 102 (step S21). At this time, the control unit 106 stores the image data and the reading size of the stored image data in the image storage unit 102. FIG. 7 is a table illustrating an example of reading size information according to the first embodiment. As illustrated in FIG. 7, identification information is added to the read image data, and the image length in the main-scanning direction and the image length in the sub-scanning direction are stored in association with identification information. As the identification information, a page number that is acquired by setting the paper document read each time as one page can be used. The document reading processing in copying processing is terminated.

FIG. 8 to FIG. 11 are views, each of which illustrates an example of the document reading processing according to the first embodiment. A description will herein be made on an example of the document reading processing at the time of copying in the case where an image forming area 320 in the image printing unit 103 is 305 mm in the main-scanning direction and 457 mm in the sub-scanning direction as indicated by the image forming area information in FIG. 4.

<In the Case where the Paper Length is Equal to or Shorter than the Imageable Length in the Main-Scanning Direction and the Sub-Scanning Direction>

Figure 8:
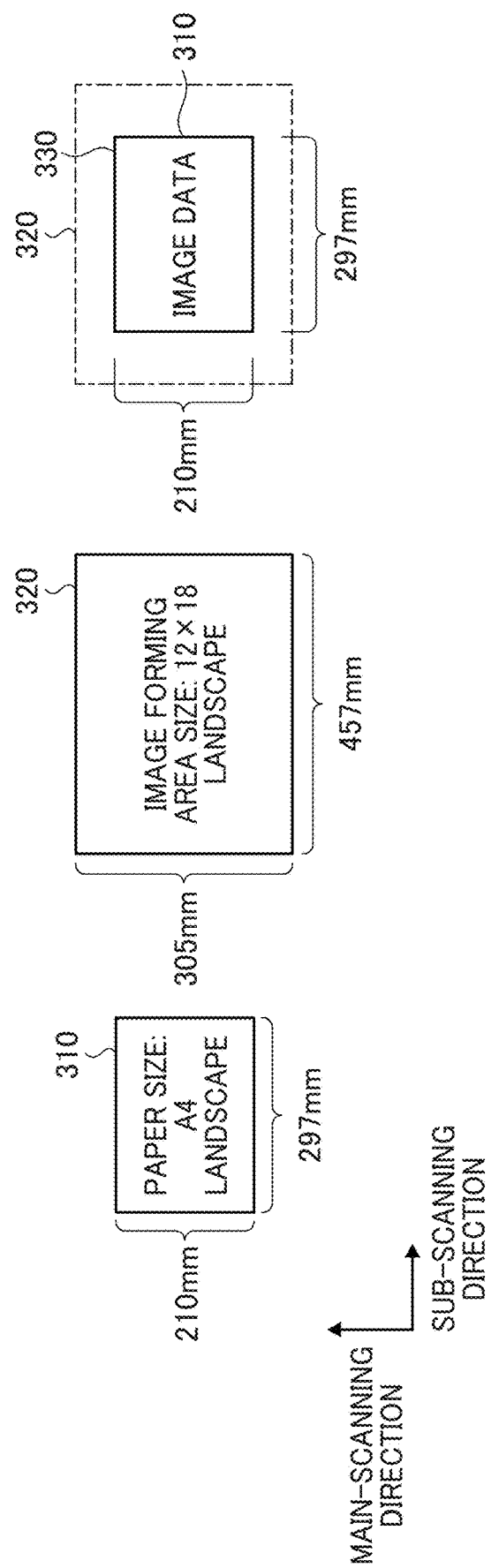
FIG. 8 is a view illustrating an example of the document reading processing according to the first embodiment.

Such a case corresponds to a case where the selection button 231a is selected in FIG. 3. The paper type in the feed tray corresponding to the selection button 231a is A4 paper. As illustrated in FIG. 8, a paper length of paper 310 in the main-scanning direction is 210 mm, and the paper length of the paper 310 in the sub-scanning direction is 297 mm. In such a case, the paper length is equal to or shorter than the imageable length in both of the main-scanning direction and the sub-scanning direction. That is, a reading size of image data 330 becomes equal to the paper length of the paper 310.

<In the Case where the Paper Length is Longer than the Imageable Length in the Main-Scanning Direction and the Sub-Scanning Direction>

Figure 9:
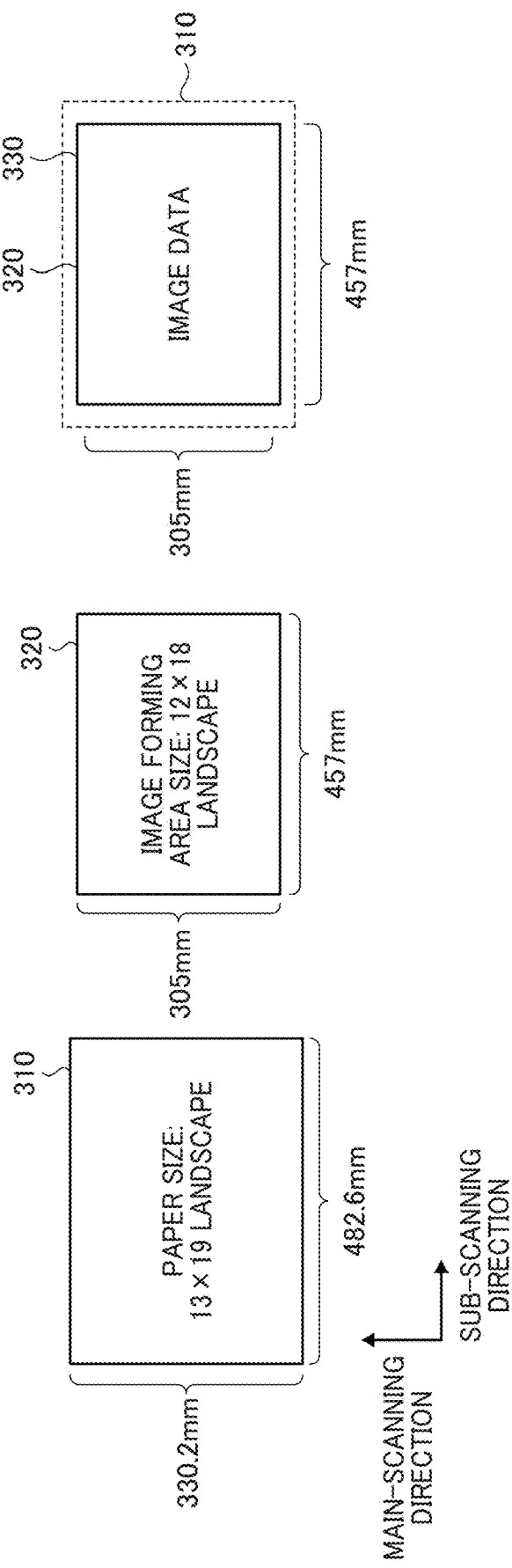
FIG. 9 is a view illustrating an example of the document reading processing according to the first embodiment.

Although not illustrated in FIG. 3, such a case corresponds to a case where 13 inch×19 inch landscape paper is selected. As illustrated in FIG. 9, the paper length of the paper 310 in the main-scanning direction is 330.2 mm, and the paper length of the paper 310 in the sub-scanning direction is 482.6 mm. In such a case, the paper length is longer than the imageable length in both of the main-scanning direction and the sub-scanning direction. That is, the reading size of the image data 330 becomes equal to the imageable length of the image forming area 320.

<In the Case where the Paper Length is Shorter than the Imageable Length in the Main Scanning Direction and the Paper Length is Longer than the Imageable Length in the Sub-Scanning Direction>

Figure 10:
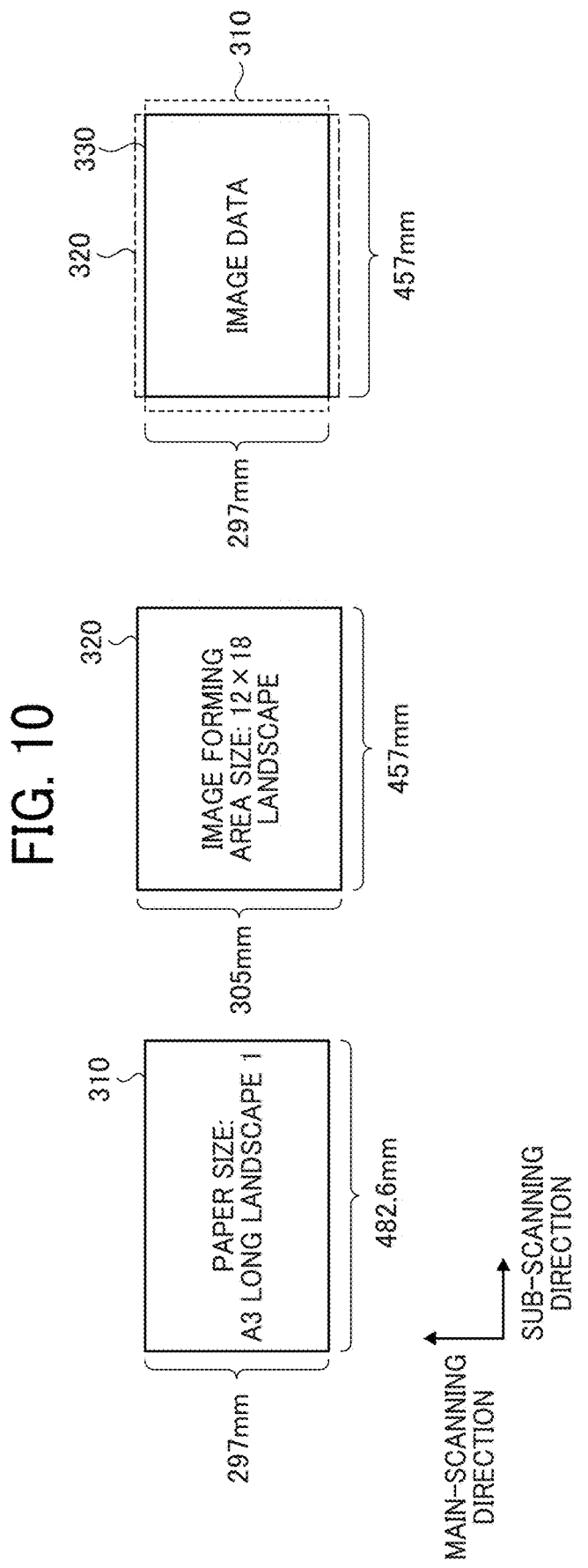
FIG. 10 is a view illustrating an example of the document reading processing according to the first embodiment.

Such a case corresponds to a case where the selection button 231d is selected in FIG. 3. The paper type in the feed tray corresponding to the selection button 231d is the A3 long paper 1. As illustrated in FIG. 10, the paper length of the paper 310 in the main-scanning direction is 297 mm, and the paper length of the paper 310 in the sub-scanning direction is 482.6 mm. In such a case, the paper length is shorter than the imageable length in the main-scanning direction, and the image forming area is shorter than the paper length in the sub-scanning direction. That is, the reading size of the image data 330 has the paper length in the main-scanning direction, and has the imageable length in the sub-scanning direction.

<In the Case where the Paper Length is Longer than the Imageable Length in the Main-Scanning Direction and the Paper Length is Shorter than the Imageable Length in the Sub-Scanning Direction>

Figure 11:
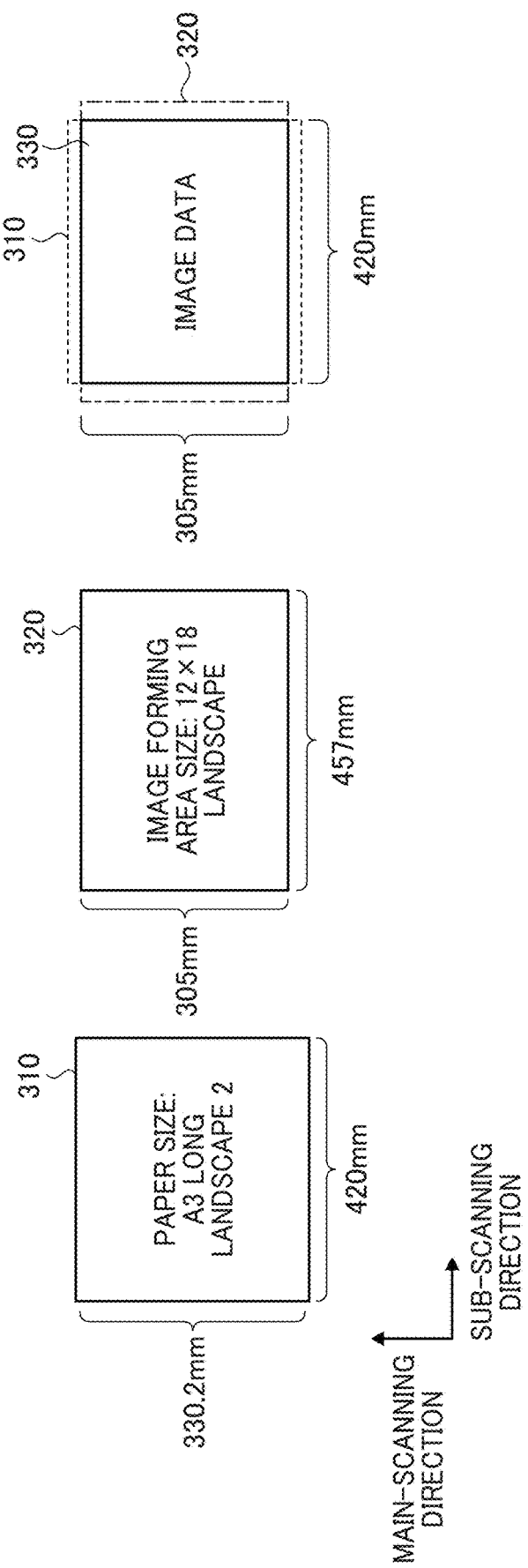
FIG. 11 is a view illustrating an example of the document reading processing according to the first embodiment.

Such a case corresponds to a case where the selection button 231e is selected in FIG. 3. The paper type in the feed tray corresponding to the selection button 231e is the A3 long paper 2. As illustrated in FIG. 11, the paper length of the paper 310 in the main-scanning direction is 330.2 mm, and the paper length of the paper 310 in the sub-scanning direction is 420 mm. In such a case, the imageable length is shorter than the paper length in the main-scanning direction, and the paper length is shorter than the image forming area in the sub-scanning direction. That is, the reading size of the image data 330 has the imageable length in the main-scanning direction, and has the paper length in the sub-scanning direction.

Figure 12:
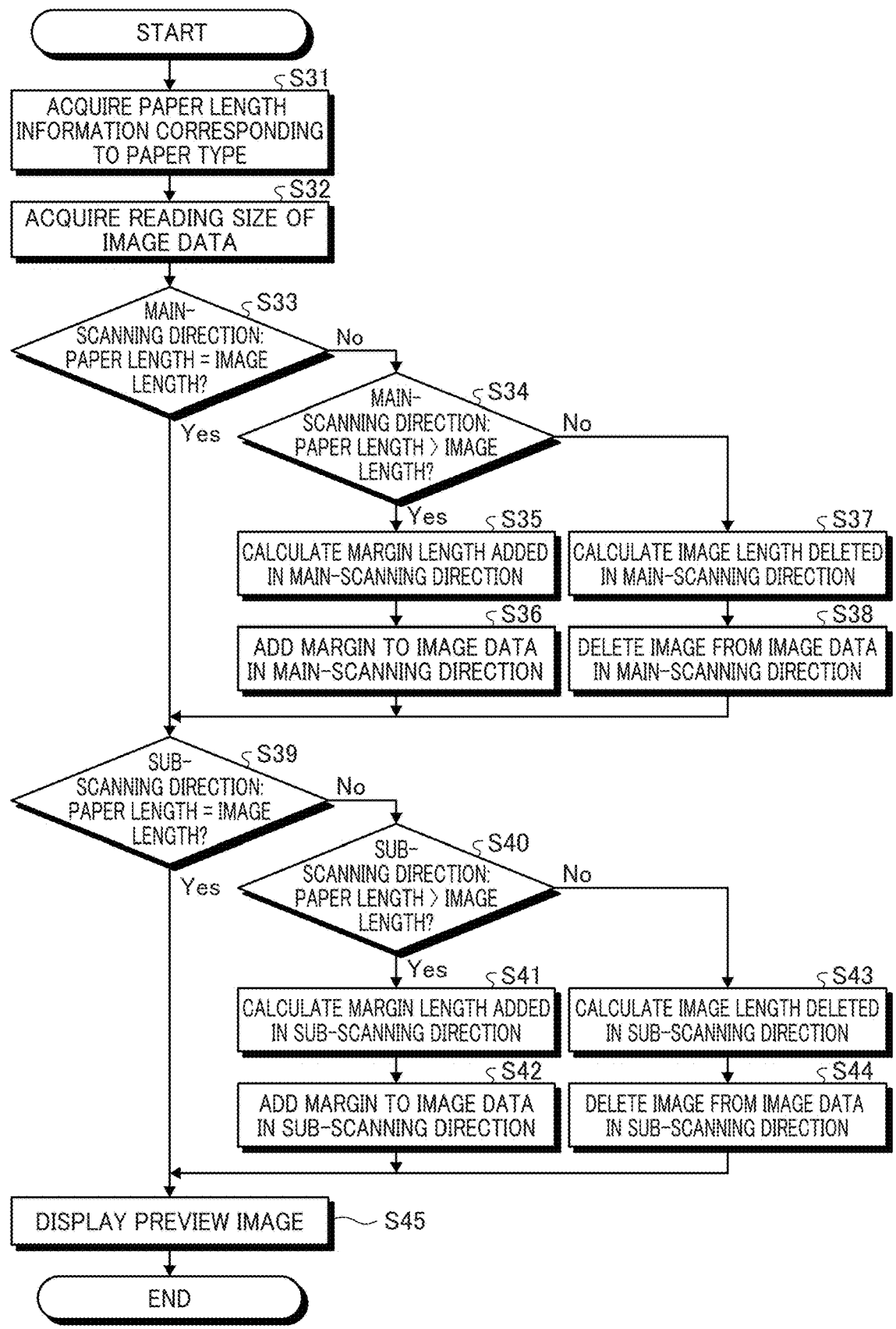
FIG. 12 is a flowchart illustrating an example of a procedure of preview image display processing according to the first embodiment.

FIG. 12 is a flowchart illustrating an example of a procedure of preview image display processing according to the first embodiment. FIG. 12 is a flowchart illustrating an example of a procedure of preview image display processing according to the first embodiment. A description will herein be made on a case where printing is executed without scaling up or down the image data, that is, at the same magnification. First, the control unit 106 acquires the paper length information that corresponds to the paper type set in the paper feed tray selected by the user from the operation unit 104 (step S31). Then, the control unit 106 acquires the reading size that corresponds to the image data to be printed from the image storage unit 102 (step S32).

Thereafter, the control unit 106 determines whether the paper length is equal to the image length of the image data in the main scanning direction (step S33). If the paper length is not equal to the image length in the main scanning direction (if No in step S33), the control unit 106 determines whether the paper length is longer than the image length in the main scanning direction (step S34). If the paper length is longer than the image length in the main scanning direction (if Yes in Step S34), the control unit 106 calculates a margin length of the margin that is added in the main scanning direction (step S35). The margin length is calculated by the following equation (1).

$$\text{Margin length} = (\text{paper length} - \text{image length})/2 \quad (1)$$

Next, the control unit 106 adds the margin having the calculated margin length to the image data in the main scanning direction (Step S36). The margin is added to both ends of the image data in the main scanning direction.

If the paper length is equal to or shorter than the image length in the main scanning direction in step S34 (if No in step S34), the control unit 106 calculates a deleted image length to be deleted from the main scanning direction (step S37). The deleted image length is calculated by the following equation (2).

$$\text{Deleted image length} = \text{image length} - \text{paper length} \quad (2)$$

Thereafter, the control unit 106 deletes the image in the calculated deleted image length from the end of the image data in the main scan direction (Step S38). For example, in the case where a specified point of an upper left point, an upper right point, a lower left point, and a lower right point of the image data or the paper is set as an origin of the print processing, the image in the calculated deleted image length is deleted from an opposite side of a side of the origin of the print processing in the main scanning direction. Meanwhile, in the case where a center of the image data or the paper is set as the origin of the print processing, a half of the image in the calculated deleted image length is deleted from each of the sides of the image data. Such processing is executed, for example, in the case where the A3-size document is scanned by an A3 machine and is printed on the A4 paper as the paper type and where a "standard size" is set in the scale-up/down setting of the image data. In addition, in the case where a setting value other than the "standard size" is set in the scale-up/down setting of the image data, a deleted region is changed according to a magnification or a size (a length) of scaling up/down.

If the paper length is equal to the image length in the main scanning direction in step 533 (if Yes in step S33), after step S36, or after step 538, the control unit 106 determines whether the paper length is equal to the image length in the sub-scanning direction. (Step S39). If the paper length is not equal to the image length in the sub-scanning direction (if No in Step S39), the control unit 106 determines whether the paper length is longer than the image length in the sub-scanning direction (Step S40). If the paper length is longer than the image length in the sub-scanning direction (if Yes in Step S40), the control unit 106 calculates the margin length of the margin to be added to the sub-scanning direction according to the equation (1) (step S41). Next, the control unit 106 adds the margin in the calculated margin length to the sub-scanning direction of the image data, which is acquired by the processing in the main scanning direction (Step S42). The margin is added to both of the ends of the image data in the sub-scanning direction.

If the paper length is equal to or shorter than the image length in the sub-scanning direction in step S40 (if No in step 40), the control unit 106 calculates the deleted image length to be deleted from the sub-scanning direction according to the equation (2) (step S43).

Thereafter, the control unit 106 deletes the image in the calculated deleted image length from the end of the image data in the sub-scanning direction, which is acquired by the processing in the main scanning direction (step S44). A way of deleting the image in such a case is the same as that described in step S38. Then, the control unit 106 displays the preview image on the display unit 105 (step S45), and the processing is terminated.

FIG. 13 to FIG. 16 are views, each of which illustrates an example of the preview image display processing according to the first embodiment. A description will herein be made on an example of the document reading processing at the time of copying in the case where the image forming area 320 in the image printing unit 103 is 305 mm in the main-scanning direction and 457 mm in the sub-scanning direction as indicated by the image forming area information in FIG. 4.

<In the Case where the Paper Length is Equal to the Image Length in the Main Scanning Direction and the Sub-Scanning Direction>

Figure 13:
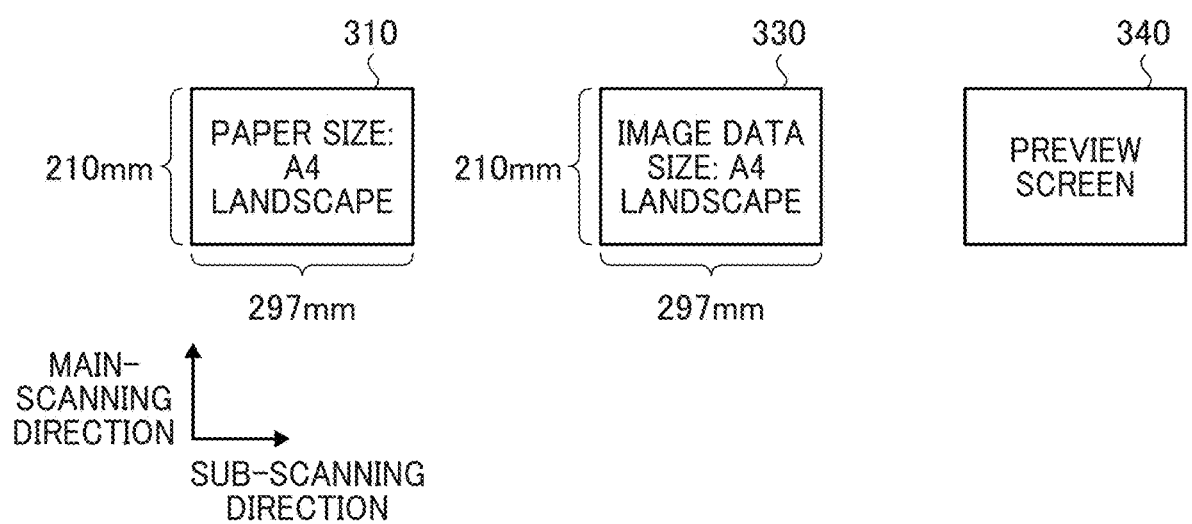
FIG. 13 is a view illustrating an example of the preview image display processing according to the first embodiment.

For example, as illustrated in FIG. 13, such a case is a case where the type of the paper 310 is the A4 size and the size of the image data 330 is also the A4 size. In such a case, the image data 330 is set as is as the preview image 340.

<In the Case where the Paper Length is Longer than the Image Length in the Main Scanning Direction and the Sub-Scanning Direction>

Figure 14:
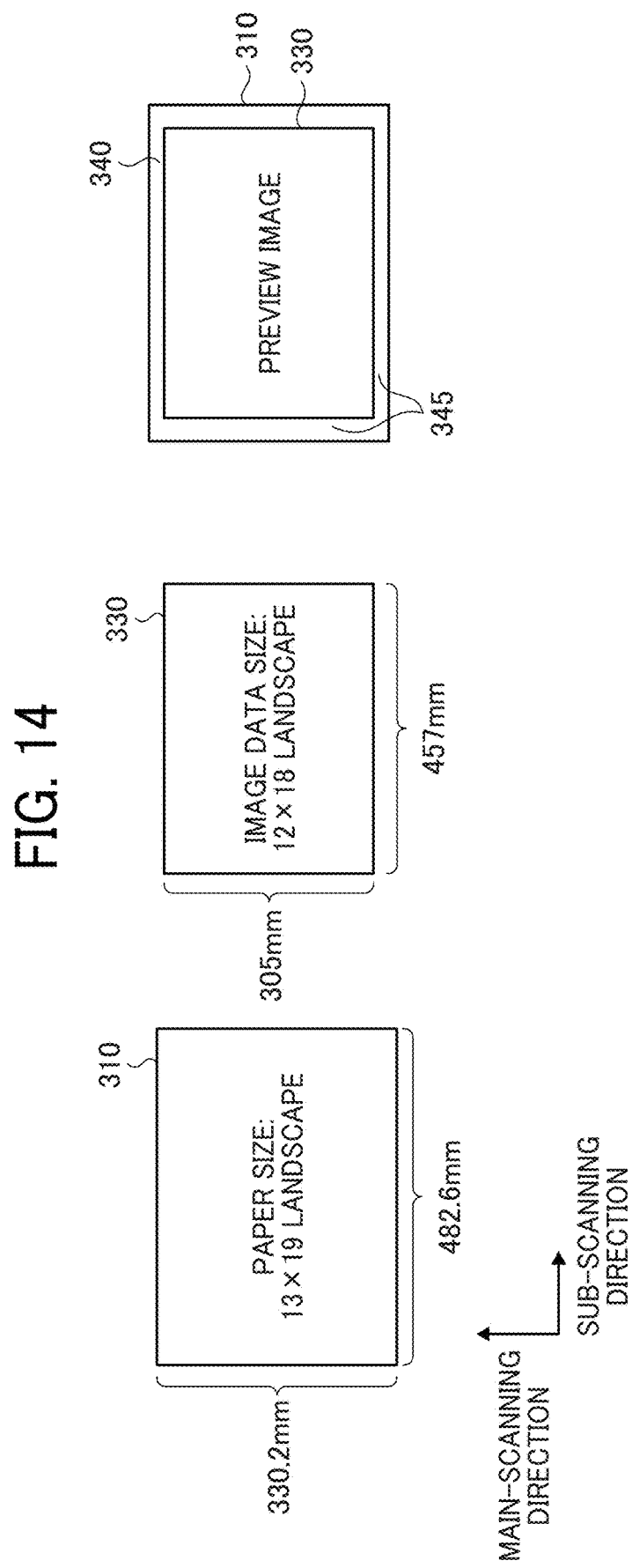
FIG. 14 is a view illustrating an example of the preview image display processing according to the first embodiment.

For example, as illustrated in FIG. 14, such a case is a case where the type of the paper 310 is the 13 inch×19 inch paper, and the size of the image data 330 is 12 inch×18 inch. In such a case, the preview image 340 is acquired by adding a margin 345 to both sides of the image data 330 in the main scanning direction and the sub-scanning direction. A size of the preview image 340 is equal to the size of the paper 310.

<In the Case where the Paper Length is Equal to the Image Length in the Main Scanning Direction and the Paper Length is Longer than the Image Length in the Sub-Scanning Direction>

Figure 15:
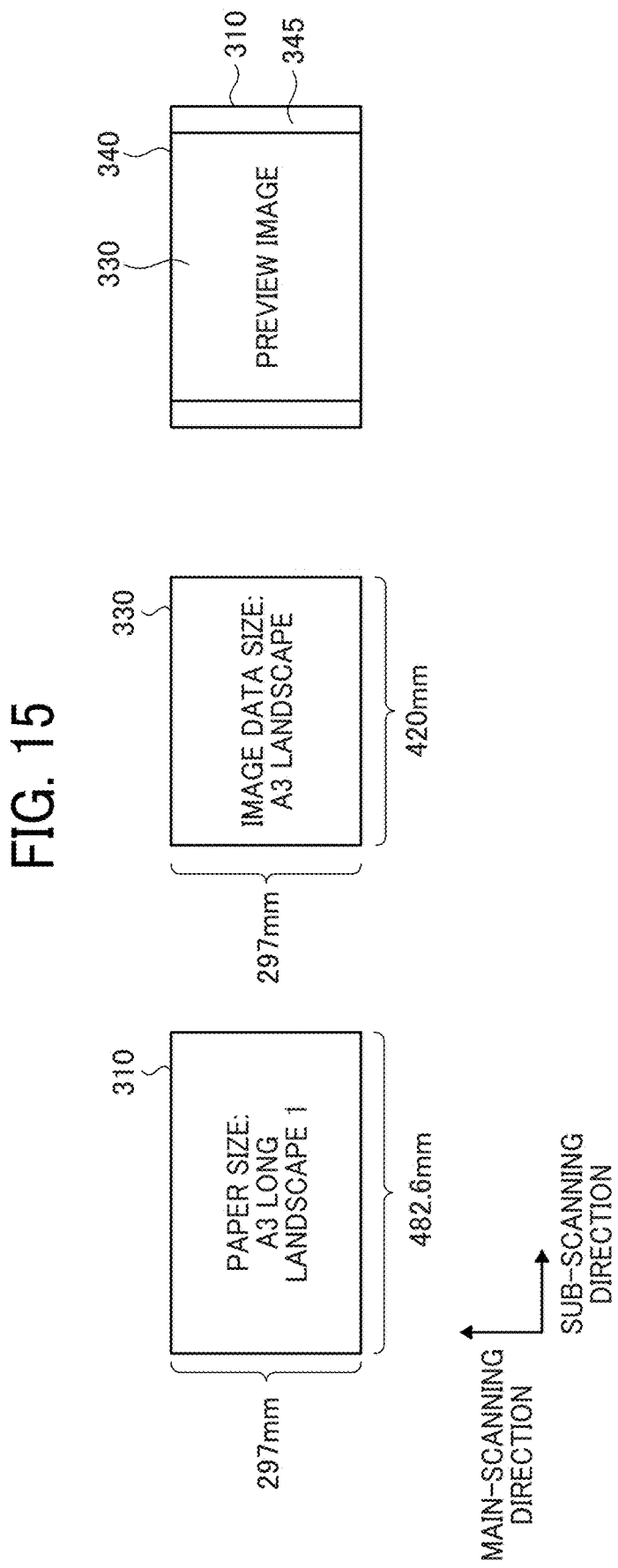
FIG. 15 is a view illustrating an example of the preview image display processing according to the first embodiment.

For example, as illustrated in FIG. 15, such a case is a case where the type of the paper 310 is the A3 long paper 1, and the size of the image data 330 is the A3 size. In such a case, the preview image 340 is acquired by adding the margin 345 to both sides of the image data 330 in the sub-scanning direction. The size of the preview image 340 is equal to the size of the paper 310.

<In the Case where the Paper Length is Longer than the Image Length in the Main Scanning Direction and the Paper Length is Equal to the Image Length in the Sub-Scanning Direction>

Figure 16:
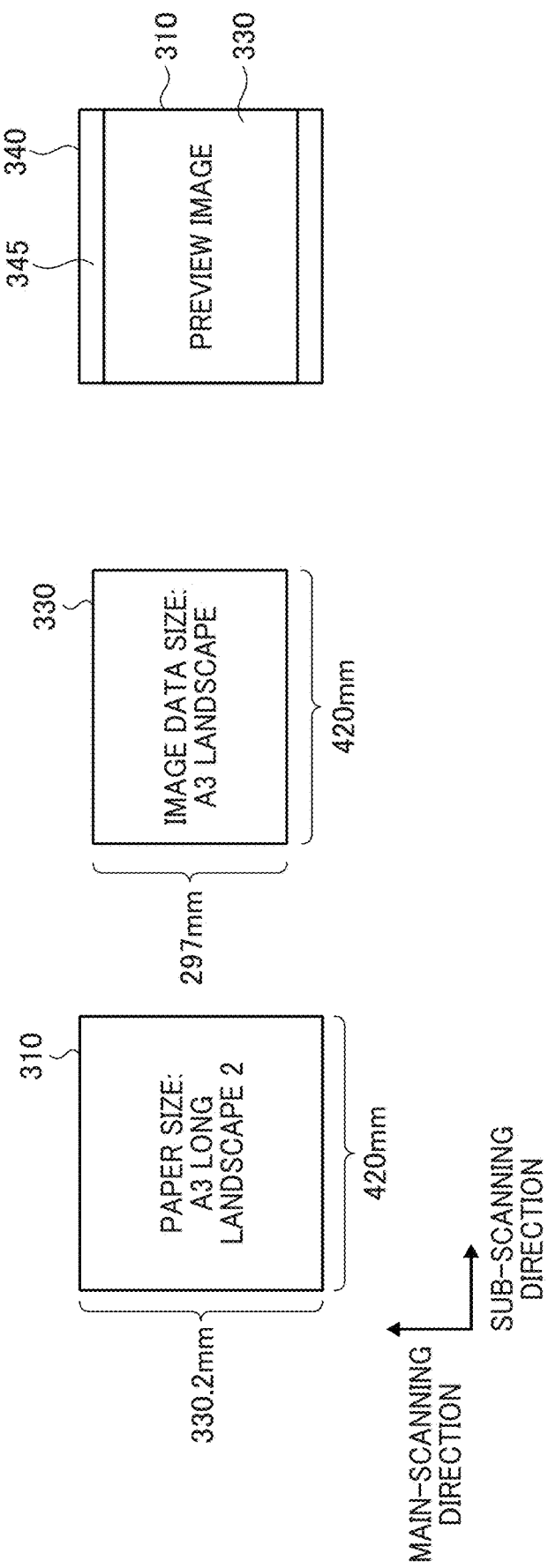
FIG. 16 is a view illustrating an example of the preview image display processing according to the first embodiment.

For example, as illustrated in FIG. 16, such a case is a case where the type of the paper 310 is the A3 long paper 2, and the size of the image data 330 is the A3 size. In such a case, the preview image 340 is acquired by adding the margin 345 to both sides of the image data 330 in the main scanning direction. The size of the preview image 340 is equal to the size of the paper 310.

Figure 17:
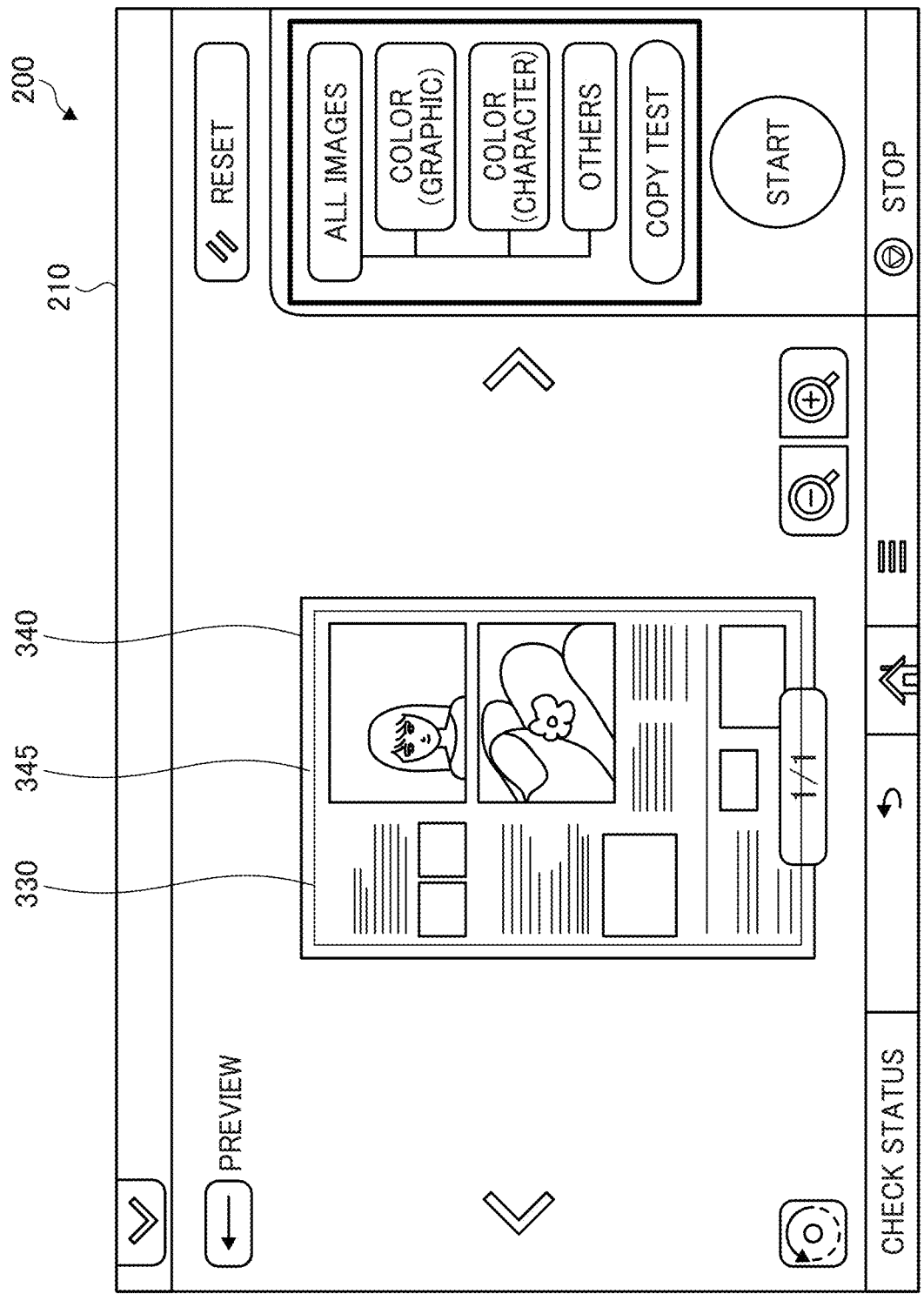
FIG. 17 is a view illustrating an example of a preview screen according to the first embodiment.

FIG. 17 is a view illustrating an example of the preview screen according to the first embodiment. FIG. 17 is a view illustrating an example of the preview screen according to the first embodiment. For example, as illustrated in FIG. 9 and FIG. 14, this figure illustrates a case where, in the main scanning direction and the sub-scanning direction, the paper length is longer than the imageable length, and the paper length is longer than the image length. On the display screen 210 of the touchscreen 200, the preview image 340 is displayed. The preview image 340 includes: the image data 330; and the margin 345 on both of the sides of the image data 330 in the main scanning direction and the sub-scanning direction. The same image as the image at the time when the image data is actually printed on the paper is displayed.

The description has been made above on the case where the preview image of the digital data, which is acquired by scanning the document in the image forming apparatus 100, is displayed on the display unit 105. However, the preview image of the printer image, which is input from the information processor, can also be displayed in the similar manner. For example, in a case of so-called pull print/on-demand print/location free print, the user can preview a print job and instruct printing. In the pull print/the on-demand print/the location free print, printing is executed when the print job is sent from the information processor to one of the image forming apparatus 100 and a print server, corresponding one of the image forming apparatus 100 and the print server keeps the print job, the user selects the document as the print target in the image forming apparatus 100 and instructs printing. In such a case, scanning is not performed, and the document reading processing at the time of copying in FIG. 6 is not executed.

In the case where the printer image, which is input from the information processor, is printed and the reading size of the stored image data is equal to the paper size, the preview image is displayed in the reading size. Meanwhile, in the case where the paper size is larger than the reading size, the preview screen, to which the margin is added, is displayed. In the case where the reading size is larger than the paper size, the preview image of the paper size, from which the image data is partially deleted, is displayed. The margin is calculated in the same manner as that in the preview image display processing illustrated in FIG. 12. However, the paper length in FIG. 12 becomes the paper size that is set by the driver, and the image length in FIG. 12 becomes an upper limit of the imageable size.

In the first embodiment, when copying is performed, shorter one of the paper length and the imageable length in each of the main scanning direction and the sub-scanning direction is set as the reading size of the image data in the document reading processing. In addition, in the preview image display processing, in the case where the paper length is longer than the image length of the image data in one of the main scanning direction and the sub-scanning direction, the preview image is formed by adding the margin to both of the sides of the image data in the corresponding scanning direction, and is displayed. In this way, when printing is performed on the paper of the larger size than the image forming area, the preview of the image, which has the same margin as the margin in the image finally printed on the paper, can be displayed. Thus, the user can check the image of the paper that is finally acquired.

In the preview image display processing illustrated in FIG. 12 according to the first embodiment, the description has been made on the example in which printing is performed at the same magnification without scaling up/down the image data. In a second embodiment, a description will be made on a method for adding the margin in the case where the image data is scaled up/down.

FIG. 18 is a view illustrating an example of the preview image display processing at the time when the image data is scaled according to the second embodiment. Here, as illustrated in FIG. 18A, a case where the type of the paper 310 is the 13 inch×19 inch paper and the size of the image data 330 is A3 is illustrated. In the case where the standard size is designated, the paper length is longer than the image length in the main scanning direction and the sub-scanning direction. Thus, as described in the first embodiment, the margin 345 is added to both of the sides of the image data 330 in the main scanning direction and the sub-scanning direction. Meanwhile, in the case where scaling up/down of the image data is instructed, the margin length, which is calculated in the first embodiment, is further adjusted according to a scale-up ratio/scale-down ratio or a scale-up size/scale-down size. A description will hereinafter be made on a case where the image data is scaled down and a case where the image data is scaled up. Here, a case where the upper right of the image data is set as an origin O will be described as an example.

<In the Case where the Image Data is Scaled Down>

Basically, processing is executed to add the margin of such a size that is acquired by scaling down the image data. In step S35 illustrated in FIG. 12, the control unit 106 calculates the margin length to be added to the main scanning direction, and also calculates an additional margin length that is generated by scaling down. The control unit 106 uses, in the main scanning direction, the image length of the image data 330 of the standard size and a scaled image length of image data 330a that is scaled down, so as to calculate the additional margin length according to the following equation (3).

$$\text{Additional margin length} = (\text{image length} - \text{scaled image length}) \quad (3)$$

Thereafter, in step S36, the control unit 106 adds the margin 345 that has the margin length calculated in the main scanning direction of the image data 330, scales down the image data 330 at the set magnification, and adds an additional margin 345a that has the calculated additional margin length. As illustrated in FIG. 18B, the image data 330a is acquired by scaling down the image data 330 at the specified magnification with the origin O being the center. At this time, the control unit 106 adds the additional margin 345a, which has the calculated additional margin length, from an opposite end in the main scanning direction from an end of an arrangement area of the image data 330 including the origin O to the inside of the image data 330.

The same processing is executed in the processing to calculate the margin length to be added in the sub-scanning direction (step S41) and the processing to add the margin (step S42).

<In the Case where the Image Data is Scaled Up>

Basically, processing is executed to remove the margin of such a size that is acquired by scaling up the image data. In step S35 illustrated in FIG. 12, the control unit 106 calculates the margin length to be added to the main scanning direction, and also calculates a deleted margin length that is generated by scaling up. The control unit 106 uses, in the main scanning direction, the image length of the image data 330 of the standard size and a scaled image length of image data 330b that is scaled up, so as to calculate the deleted margin length according to the following equation (4).

$$\text{Deleted margin length} = (\text{scaled image length} - \text{image length}) \quad (4)$$

Thereafter, in step S36, the control unit 106 adds the margin 345 that has the margin length calculated in the main scanning direction of the image data 330, scales up the image data at the set magnification, and deletes a margin 347, which corresponds to the calculated deleted margin length, from the margin 345. As illustrated in FIG. 18C, the image data 330a is acquired by scaling down the image data 330 at the specified magnification with the origin O being the center. At this time, the control unit 106 deletes the margin 347, which has the calculated deleted margin length, from the opposite end in the main scanning direction from the end of the arrangement area of the image data 330 including the origin O to the outside of the image data 330.

The same processing is executed in the processing to calculate the margin length to be added in the sub-scanning direction (step S41) and the processing to add the margin (step S42).

The description has been made on the case where the origin O is located at the upper right of the image data 330 as the example. However, a specified point may be set as the origin from the upper left, the lower left, and the lower right of the image data and the upper left, the upper right, the lower left, and the lower right of the paper. Alternatively, the center of the image data or the paper may be set as the origin. FIG. 19 is a view of another example of the preview image display processing at the time when the image data is scaled according to the second embodiment. Here, similar to FIG. 18, a case where the type of the paper 310 is the 13 inch×19 inch paper and the size of the image data 330 is A3 is illustrated. In addition, a case where the origin O is located at the center of the image data 330 is illustrated.

As illustrated in FIG. 19A, in the case where the image data 330 is scaled down, the additional margin 345a, the length of which is the half of the additional margin length calculated by the equation (3), is added from both of the ends in the main scanning direction of the arrangement area of the image data 330 to the inside thereof.

Meanwhile, as illustrated in FIG. 19B, in the case where the image data 330 is scaled up, the margin 347, the length of which is the half of the deleted margin length calculated by the equation (4), is deleted from both of the ends in the main scanning direction of the arrangement area of the image data 330 to the outside thereof.

In the second embodiment, in the case where scaling up/down of the image data is instructed, the margin of the scaled-up size is removed, and the margin of the scaled-down size is added. In this way, even in the case where printing is performed on the larger paper than the image forming area and the magnification of the image data is changed, the preview of the image, which has the same margin as the margin in the image finally printed on the paper, can be displayed. Thus, the user can check the image of the paper that is finally acquired.

The program that is executed by the image forming apparatus 100 according to the present embodiment is recorded in an installable format or an executable format in a computer readable recording medium such as compact disc (CD)-ROM, a flexible disc (FD), CD-recordable (R), or a digital versatile disk (DVD), and is then provided.

In addition, the program that is executed by the image forming apparatus 100 according to the present embodiment may be configured to be stored in a computer that is connected to the network such as the Internet and downloaded via the network to be provided. Furthermore, the program that is executed by the image forming apparatus 100 according to the present embodiment may be configured to be provided or distributed via the network such as the Internet.

Moreover, the program that is executed by the image forming apparatus 100 according to the present embodiment may be configured to be incorporated in advance in program ROM or the like and provided.

In the above embodiment, the description has been made on the example in which the image forming apparatus is applied to a multifunction peripheral that has at least two functions of the copier function, the printer function, the scanner function, and a facsimile function. However, the present invention can be applied to any type of the image forming apparatus when the image forming apparatus is a copier, a printer, a scanner, a facsimile machine, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:
an image forming device;
a scanner configured to read a document into image data; and
circuitry configured to receive an instruction to print an image based on the image data according to print settings, and
check whether or not the print settings indicate to print the image on a recording sheet having a second size, relatively larger than a first size of the image data, and
control a display to display a preview image, based on the check indicating that the print settings indicate to print the image on a recording sheet having the second size relatively larger than the first size of the image data, reflecting a printed image of the image data, the preview image including a margin at least at one side of the printed image, the margin having a size determined based on the second size of the recording sheet, wherein the circuitry is further configured to
determine the first size of the image to be equal to the second size of the recording sheet, based on a determination that an area of the recording sheet is relatively smaller than an image forming area of an image forming device; and
determine the first size of the image to be equal to a size of the image forming area, based on a determination that an area of the recording sheet is relatively larger than the image forming area of the image forming device.

2. The image forming apparatus of claim 1,
wherein the circuitry is configured to:
determine the first size of the image to be a maximum size of an overlapping area where an image forming area of the image forming device and an area of the recording sheet are overlapped with each other; and
generate the image having the first size based on the image data read by the scanner.

3. The image forming apparatus of claim 2, wherein
the recording sheet has a pair of first sides that extend in a first direction and a pair of second sides that extend in a second direction orthogonal to the first direction, and
the circuitry is configured to add the margin in the first direction and the second direction to generate the preview image.

4. The image forming apparatus of claim 3, wherein the circuitry is configured to partially delete the printed image to generate the preview image.

5. The image forming apparatus of claim 2, further comprising:
a display, to display the preview image.

6. The image forming apparatus of claim 1, wherein
in response to an instruction to print the image to which scaling is applied, the circuitry is configured to:
obtain a difference between the first size of the image and a third size of the scaled image; and
adjust the size of the margin of the preview image according to the difference obtained.

7. The image forming apparatus of claim 6, wherein upon the instruction to print the image indicates to scale down the image to be printed, the circuitry is configured to increase the size of the margin by an amount corresponding to the difference obtained, between the first size and the third size.

8. The image forming apparatus of claim 7, wherein upon the instruction to print the image indicates to scale up the image to be printed, the circuitry is configured to decrease the size of the margin by an amount corresponding to the difference obtained, between the third size and the first size.

9. The image forming apparatus of claim 6, wherein upon the instruction to print the image indicates to scale up the image to be printed, the circuitry is configured to decrease the size of the margin by an amount corresponding to the difference obtained, between the third size and the first size.

10. The image forming apparatus of claim 1, wherein
the recording sheet has a pair of first sides that extend in a first direction and a pair of second sides that extend in a second direction orthogonal to the first direction, and
the circuitry is configured to add the margin in the first direction and the second direction to generate the preview image.

11. The image forming apparatus of claim 10, wherein the circuitry is configured to partially deletes the printed image to generate the preview image.

12. The image forming apparatus of claim 1, further comprising:
a display, to display the preview image.

13. A display control method comprising:
receiving an instruction to print an image based on image data according to print settings;
checking whether or not the print settings indicate to print the image on a recording sheet having a second size relatively larger than a first size of the image data;
displaying on a display, based on the checking indicating that the print settings indicate to print the image on a recording sheet having a second size relatively larger than a first size of the image, a preview image reflecting a printed image of the image data, the preview image including a margin at least at one side of the printed image, the margin having a size determined based on the second size of the recording sheet; and
determining whether or not the recording sheet is relatively smaller than an image forming area of an image forming device forming the image;
wherein, upon the determining indicating that the recording sheet is relatively smaller than the image forming area, determining the first size of the image to be the second size of the recording sheet, and
wherein, upon the determining indicating that the recording sheet is relatively larger than the image forming area, determining the first size of the image to be equal to a size of the image forming area.

14. The display control method of claim 13,
determining the first size of the image to be a maximum size of an overlapping area where an image forming area of the image forming device and an area of the recording sheet are overlapped with each other; and
generating the image having the first size based on the image data.

15. The display control method of claim 13, further comprising:
obtaining a difference between the first size of the image and a third size of the scaled image, in response to an instruction to print the image to which scaling is applied; and
adjusting a size of the margin of the preview image according to the difference obtained.

16. The display control of claim 15, wherein, upon the instruction to print the image indicating to scale down the image to be printed, the adjusting includes increasing the size of the margin by an amount corresponding to the difference obtained between the first size and the third size.

17. The display control method of claim 16, wherein, upon the instruction to print the image indicating to scale up the image to be printed, the adjusting includes decreasing the size of the margin by an amount corresponding to the difference obtained between the third size and the first size.

18. The display control method of claim 15, wherein, upon the instruction to print the image indicating to scale up the image to be printed, the adjusting includes decreasing the size of the margin by an amount corresponding to the difference obtained between the third size and the first size.

19. A non-transitory recording medium which, when executed by one or more processors, cause the processors to perform a display control method comprising:
receiving an instruction to print an image based on image data according to print settings;
checking whether or not the print settings indicate to print the image on a recording sheet having a second size relatively larger than a first size of the image data:
displaying on a display, based on the checking indicating that the print settings indicate to print the image on a recording sheet having a second size relatively larger than a first size of the image, a preview image reflecting a printed image of the image data, the preview image including a margin at least at one side of the printed image, the margin having a size determined based on the second size of the recording sheet; and
determining whether or not the recording sheet is relatively smaller than an image forming area of an image forming device forming the image;
wherein, upon the determining indicating that the recording sheet is relatively smaller than the image forming area, determining the first size of the image to be the second size of the recording sheet, and
wherein, upon the determining indicating that the recording sheet is relatively larger than the image forming area, determining the first size of the image to be equal to a size of the image forming area.

* * * * *